United States Patent
Takamichi

(10) Patent No.: US 7,173,939 B2
(45) Date of Patent: Feb. 6, 2007

(54) STM MAPPING CIRCUIT AND METHOD

(75) Inventor: Toru Takamichi, Tokyo (JP)

(73) Assignee: NEC Corporation, Tokyo (JP)

( * ) Notice: Subject to any disclaimer, the term of this patent is extended or adjusted under 35 U.S.C. 154(b) by 1084 days.

(21) Appl. No.: 10/106,037

(22) Filed: Mar. 27, 2002

(65) Prior Publication Data

US 2002/0141407 A1 Oct. 3, 2002

(30) Foreign Application Priority Data

Mar. 28, 2001 (JP) ............................. 2001-093570

(51) Int. Cl.
 *H04L 12/56* (2006.01)
(52) U.S. Cl. ..................... 370/401; 370/466; 370/505
(58) Field of Classification Search ................ 370/389, 370/471, 466, 542, 477, 505, 401
See application file for complete search history.

(56) References Cited

U.S. PATENT DOCUMENTS 6,097,739 A * 8/2000 Yamashita ................. 370/528

| | | | |
|---|---|---|---|
| 6,414,966 B1 * | 7/2002 | Kulkarni et al. | 370/465 |
| 6,584,118 B1 * | 6/2003 | Russell et al. | 370/466 |
| 2002/0016852 A1 * | 2/2002 | Nishihara | 709/236 |
| 2002/0159473 A1 * | 10/2002 | Roberts et al. | 370/442 |

* cited by examiner

*Primary Examiner*—Min Jung
(74) *Attorney, Agent, or Firm*—McGinn IP Law Group, PLLC

(57) ABSTRACT

An STM mapping circuit is disclosed having a configuration that includes: a packet length detection circuit for generating byte effectiveness information that indicates whether byte data are effective data or not; routing circuits for generating routing information for rearranging byte data in a prescribed order while using byte effectiveness information to eliminate pad bytes; packet filter circuits for taking in packet data for each logical channel in accordance with channel number signals that indicate which logical channel the packet data belong to; M×M switches for sorting packet data for logical channel in a prescribed order while removing pad bytes in accordance with routing information; and packet memories that hold, for each logical channel, packet data that have been sorted by the M×M switches.

25 Claims, 11 Drawing Sheets

| | | | | | | | |
|---|---|---|---|---|---|---|---|
| D-1 | C-9 | C-1 | B-9 | B-1 | A-9 | A-1 | BYTE0 |
| D-2 | C-10 | C-2 | B-10 | B-2 | A-10 | A-2 | BYTE1 |
| D-3 | C-11 | C-3 | B-11 | B-3 | PAD | A-3 | BYTE2 |
| D-4 | C-12 | C-4 | B-12 | B-4 | PAD | A-4 | BYTE3 |
| D-5 | PAD | C-5 | B-13 | B-5 | PAD | A-5 | BYTE4 |
| D-6 | PAD | C-6 | B-14 | B-6 | PAD | A-6 | BYTE5 |
| D-7 | PAD | C-7 | PAD | B-7 | PAD | A-7 | BYTE6 |
| D-8 | PAD | C-8 | PAD | B-8 | PAD | A-8 | BYTE7 |

FIG.1A
PRIOR ART

| | | | | | | |
|---|---|---|---|---|---|---|
| D-5 | C-9 | C-1 | B-7 | A-9 | A-1 | BYTE0 |
| D-6 | C-10 | C-2 | B-8 | A-10 | A-2 | BYTE1 |
| D-7 | C-11 | C-3 | B-9 | B-1 | A-3 | BYTE2 |
| D-8 | C-12 | C-4 | B-10 | B-2 | A-4 | BYTE3 |
| D-1 | C-5 | B-11 | B-3 | A-5 | | BYTE4 |
| D-2 | C-6 | B-12 | B-4 | A-6 | | BYTE5 |
| D-3 | C-7 | B-13 | B-5 | A-7 | | BYTE6 |
| D-4 | C-8 | B-14 | B-6 | A-8 | | BYTE7 |

| | | | | | | | |
|---|---|---|---|---|---|---|---|
| PHYSICAL CH41 → PHYSICAL CH48 | LOGICAL CH7 | LOGICAL CH7 | LOGICAL CH7 | LOGICAL CH7 | LOGICAL CH8 | LOGICAL CH8 | LOGICAL CH8 |
| PHYSICAL CH33 → PHYSICAL CH40 | LOGICAL CH7 | LOGICAL CH7 | LOGICAL CH7 | LOGICAL CH7 | LOGICAL CH7 | LOGICAL CH7 | LOGICAL CH7 |
| PHYSICAL CH25 → PHYSICAL CH32 | LOGICAL CH5 | LOGICAL CH5 | LOGICAL CH5 | LOGICAL CH5 | LOGICAL CH6 | LOGICAL CH6 | LOGICAL CH6 |
| PHYSICAL CH17 → PHYSICAL CH24 | LOGICAL CH4 | LOGICAL CH4 | LOGICAL CH4 | LOGICAL CH4 | LOGICAL CH4 | LOGICAL CH4 | LOGICAL CH4 |
| PHYSICAL CH9 → PHYSICAL CH16 | LOGICAL CH2 | LOGICAL CH2 | LOGICAL CH2 | LOGICAL CH2 | LOGICAL CH2 | LOGICAL CH3 | LOGICAL CH3 |
| PHYSICAL CH1 → PHYSICAL CH8 | LOGICAL CH1 | LOGICAL CH1 | LOGICAL CH1 | LOGICAL CH1 | LOGICAL CH1 | LOGICAL CH1 | LOGICAL CH1 |

| RELEVANT CH OUTPUT POSITION | LEADING MEMORY NO. | ROUTING INFORMATION ||||
|---|---|---|---|---|---|
| | | INPUT PORT 0 | INPUT PORT 1 | INPUT PORT 2 | INPUT PORT 3 |
| 0000 | 0~3 | 00 | 01 | 10 | 11 |
| 0001 | 0 | 11 | 00 | 01 | 10 |
| | 1 | 10 | 11 | 00 | 01 |
| | 2 | 01 | 10 | 11 | 00 |
| | 3 | 00 | 01 | 10 | 11 |
| 0010 | 0 | 10 | 11 | 00 | 01 |
| | 1 | 01 | 10 | 11 | 00 |
| | 2 | 00 | 01 | 10 | 11 |
| | 3 | 11 | 00 | 01 | 10 |
| 0011 | 0 | 10 | 11 | 00 | 01 |
| | 1 | 01 | 10 | 11 | 00 |
| | 2 | 00 | 01 | 10 | 11 |
| | 3 | 11 | 00 | 01 | 10 |
| 0100 | 0 | 01 | 10 | 11 | 00 |
| | 1 | 00 | 01 | 10 | 11 |
| | 2 | 11 | 00 | 01 | 10 |
| | 3 | 10 | 11 | 00 | 01 |
| 0101 | 0 | 01 | 11 | 00 | 10 |
| | 1 | 10 | 01 | 11 | 00 |
| | 2 | 00 | 10 | 01 | 11 |
| | 3 | 11 | 00 | 10 | 01 |
| 0110 | 0 | 01 | 10 | 11 | 00 |
| | 1 | 00 | 01 | 10 | 11 |
| | 2 | 11 | 00 | 01 | 10 |
| | 3 | 10 | 11 | 00 | 01 |
| 0111 | 0 | 01 | 10 | 11 | 00 |
| | 1 | 00 | 01 | 10 | 11 |
| | 2 | 11 | 00 | 01 | 10 |
| | 3 | 10 | 11 | 00 | 01 |
| 1000 | 0 | 00 | 01 | 10 | 11 |
| | 1 | 11 | 00 | 01 | 10 |
| | 2 | 10 | 11 | 00 | 01 |
| | 3 | 01 | 10 | 11 | 00 |
| 1001 | 0 | 00 | 11 | 01 | 10 |
| | 1 | 10 | 00 | 11 | 01 |
| | 2 | 01 | 10 | 00 | 01 |
| | 3 | 11 | 01 | 10 | 00 |
| 1010 | 0 | 00 | 10 | 11 | 01 |
| | 1 | 01 | 00 | 10 | 11 |
| | 2 | 11 | 01 | 00 | 10 |
| | 3 | 10 | 11 | 01 | 00 |
| 1011 | 0 | 00 | 10 | 11 | 01 |
| | 1 | 01 | 00 | 10 | 11 |
| | 2 | 11 | 01 | 00 | 10 |
| | 3 | 10 | 11 | 01 | 00 |
| 1100 | 0 | 00 | 01 | 10 | 11 |
| | 1 | 11 | 00 | 01 | 10 |
| | 2 | 10 | 11 | 00 | 01 |
| | 3 | 01 | 10 | 11 | 00 |
| 1101 | 0 | 00 | 01 | 11 | 10 |
| | 1 | 10 | 00 | 01 | 11 |
| | 2 | 11 | 10 | 00 | 01 |
| | 3 | 01 | 11 | 10 | 00 |
| 1110 | 0 | 00 | 01 | 10 | 11 |
| | 1 | 11 | 00 | 01 | 10 |
| | 2 | 10 | 11 | 00 | 01 |
| | 3 | 01 | 10 | 11 | 00 |

FIG. 7

STM MAPPING CIRCUIT AND METHOD

BACKGROUND OF THE INVENTION

1. Field of the Invention

The present invention relates to an STM mapping circuit that performs a mapping process for storing packet data in the payload of STS (Synchronous Transport Signal) frames or STM (Synchronous Transfer Module) frames while distributing the packet data to prescribed logic channels.

2. Description of the Related Art

In recent years, the transmission bit rate of communication lines has been increasing to meet the demand for increase in the amount of traffic in information communication. However, the transmission bit rate is limited by the signal processing speed of transmission devices, i.e., factors such as the processing speed of LSI and the inter-device data transfer speed, and methods have therefore been adopted for handling higher speeds by processing after expanding a received signal into parallel signals. For example, when a signal is received from a communication line having a transmission bit rate of 2.488 Gbps, the signals can be handled with sufficient processing speed if the received signal is parallel-expanded to 64 38.88-Mbps signals.

When processing variable-length packets in which the data length varies with each packet as in PPP (Point-to-Point Protocol), the variable-length packets are typically broken up into small packets of fixed length such as ATM (Asynchronous Transfer Mode) cells which then undergo switching in transmission devices. In recent years, however, methods have been proposed for handling variable-length packets as-is without breaking them into fixed-length packets by means of standardized work such as T1×1. GFP (Generic Framing Procedure) and SDL (Simple Data Link) are known as communication methods that carry out this type of processing.

In the above-described GFP and SDL, pad bytes are inserted between variable-length packets, and the length of each packet is converted to a length that is an integer power of the number of parallel-expanded signals. Pad bytes are constituted by a predetermined pattern in which "0" and "1" are repeated, or by a pattern of all "0", and the pad byte itself has no logical significance.

Signal sequences in which such pad bytes are inserted are shown in FIG. 1A and FIG. 1B.

FIG. 1A and FIG. 1B show examples of signal sequences that are processed in a transmission device, FIG. 1A being a schematic diagram of an example of a signal sequence in which pad bytes have been inserted, and FIG. 1B being a schematic diagram showing an example of a signal sequence in which there are no pad bytes.

FIG. 1A is an example in which packet data have been parallel-expanded into eight bytes (from byte 0 to byte 7). Data sequence A that is shown in FIG. 1A is a packet of a total of 10 bytes from byte data A-1 to A-10, six pad bytes being inserted between byte data A-10 and the next data sequence B. Similarly, data sequence B is a packet of a total of 14 bytes from byte data B-1 to B-14, two pad bytes being inserted between byte data B-14 and the next data sequence C. Data sequence C is a packet of a total of 12 bytes from byte data C-1 to C-12, four pad bytes being inserted between byte data C-12 and the next data sequence D.

When pad bytes of a prescribed number are inserted between each of variable-length packets in this way, the leading byte data of each packet can each be stored in the leading byte of the parallel-expanded signal sequence (Byte 0 in FIG. 1A), thereby making the head of each packet obvious and facilitating subsequent processing.

For example, when a predetermined fixed-length bit pattern is inserted at the head of a packet, the bit pattern can be easily detected by monitoring Byte 0. In addition, processing such as switching is facilitated because data of a plurality of packets are not contained within the data of a plurality of bytes (Bytes 0–7 in FIG. 1A) that are processed all at once by means of parallel expansion.

Nevertheless, when packets that contain pad bytes are outputted from a transmission device to a communication line, the pad bytes are unnecessary data that take up more of the line bandwidth than is necessary and are therefore preferably eliminated as shown in FIG. 1B.

FIG. 1B shows the state of a signal sequence in which the pad bytes shown in FIG. 1A have been eliminated and byte data B-1 of data sequence B are inserted after byte data A-10 of data sequence A. Similarly, data C-1 of data sequence C are inserted after data B-14 of data sequence B, and data D-1 of data sequence D are inserted after data C-12 of data sequence C.

As a means of eliminating the pad bytes, a method can be considered in which, for example, each item of packet data that contains pad bytes is first stored in memory, and then, after determining whether each item of data is effective data or pad bytes, extracting only the effective data.

However, the communication method in which processing is performed after inserting pad bytes between variable-length packets is a new technique that has only recently been proposed, and no proposals have been made regarding a specific method of eliminating pad bytes.

Nevertheless, STM/Packet hybrid switches have been developed in recent years for performing switching of packets of PPP (Point-to-Point Protocol) or the transmission frames of STM format, which is a multiplexed format, in SDH (Synchronous Digital Hierarchy), but these devices necessitate processing to eliminate the above-described pad bytes. As a result, STM mapping circuits that are equipped in the above-described STM/Packet hybrid switches for mapping byte data to the payload areas of transmission frames are preferably provided with the capacity to eliminate pad bytes.

When storing units of AU (Administrative Unit)-3 or AU-4 in the payload areas of the transmission frames of STS (Synchronous Transport Signal)-n and STM (Synchronous Transfer Module)-n, the processing units are referred to as "channels." This type of channel is hereinbelow referred to as a "physical channel," and packet classifications that are distinguished for each destination by means of the header portions of variable-length packets are hereinbelow referred to as "logical channels."

SUMMARY OF THE INVENTION

The present invention was achieved for the purpose of solving the problem of the above-described prior art and has as an object the provision of an STM mapping circuit that is capable of a mapping packet data while eliminating pad bytes.

The STM mapping circuit of the present invention is an STM mapping circuit for realizing the above-described object and performs a mapping process for storing data in transmission frames while distributing the data in byte units to prescribed logical channels and is constituted by:

a packet length detection circuit for receiving a plurality of byte data that have been parallel-expanded to M signals that contain pad bytes and generating byte effectiveness information that indicates whether each item of byte data is effective data or pad bytes;

routing circuits for generating routing information for rearranging each item of the byte data in a prescribed order while using said byte effectiveness information to eliminate the pad bytes; packet filter circuits for taking in each item of packet data for each logical channel in accordance with channel number signals that indicate which logical channel the packet data belong to;

M×M switches for rearranging the packet data of each logical channel in a prescribed order while eliminating the pad bytes in accordance with routing information; and packet memories for holding, for each of the logical channels, packet data that have been rearranged by the M×M switches;

where k is a positive integer and M=2k.

Here, the routing circuits may generate routing information for causing the M×M switches to rearrange each item of the packet data in time divisions in units of the logical channels; and the M×M switches may rearrange each item of the packet data in time divisions in units of the logical channel in accordance with the routing information.

The mapping circuit of the present invention may further include:

a channel control memory in which information is recorded for reading out each item of the byte data in a prescribed order from the packet memories that are provided for each of the logical channels;

second M×M switches for rearranging the byte data in a prescribed order in accordance with information that has been recorded in the channel control memory; and selector circuits for multiplexing byte data for each of the logical channels that have been output from the second M×M switches;

wherein the selector circuits may read out, as byte data of any plurality of logical channels, the byte data of the same physical channel within the processing period that is necessary for reading out byte data of all physical channels.

The M×M switches are preferably banyan switches composed of a plurality of 2×2 switches connected in multiple stages.

The STM mapping method of the present invention is an STM mapping method for storing data in transmission frames while distributing the data in byte units to prescribed logical channels; the method including the steps of:

generating, from a plurality of byte data that includes pad bytes and that has been parallel-expanded to M signals, byte effectiveness information that indicates whether each item of the byte data is effective data or the pad bytes;

generating routing information for rearranging the byte data in a prescribed order while using the byte effectiveness information to eliminate the pad bytes; taking in each item of packet data for each logical channel in accordance with channel number signals that indicate which logical channel the packet data belong to;

using M×M switches to rearrange packet data for each logical channel in a prescribed order while eliminating the pad bytes in accordance with routing information; and holding the packet data that have been rearranged by the M×M switches in memories for each of the logical channels;

where k is a positive integer and M=$2^k$.

Here, routing information may be generated for rearranging each item of packet data in time divisions by logical channel units; and the M×M switches may be used to rearrange each item of packet data in time divisions by logical channel units in accordance with the routing information.

In addition, logical channel information may be generated for reading out each item of byte data in a prescribed order from the memories in which the packet data are held for each logical channel;

the byte data for each logical channel may be rearranged in a prescribed order in accordance with the logical channel information; and the byte data that have been rearranged for each logical channel may be multiplexed; or byte data of the same logical channel may be read out as the byte data for any plurality of physical channels within the processing period that is necessary for reading out the byte data of all physical channels.

The M×M switches are preferably banyan switches composed of a plurality of 2×2 switches connected in multiple stages.

The above-described constitution of the present invention makes possible the following effects:

In the above-described STM mapping circuit and method, byte effectiveness information that indicates whether each item of byte data is effective data or a pad byte is generated from a plurality of byte data that have been parallel-expanded to M signals containing pad bytes; routing information for rearranging data in a prescribed order are generated while using the byte effectiveness information to eliminate pad bytes; packet data are each taken in by each logical channel in accordance with channel number signals that indicate which logical channel the packet data belong to; M×M switches are used to rearrange packet data for each logical channel in a prescribed order while eliminating pad bytes in accordance with routing information; and the packet data that have been rearranged by the M×M switches are held for each logical channel; and as a result, an STM mapping circuit can be realized that can perform mapping of data while eliminating pad bytes.

In addition, routing information is generated for rearranging each item of packet data in time divisions in logical channel units, and the packet data are each rearranged in time divisions in logical channel units in accordance with the routing information, thereby eliminating the need to provide routing circuits that generate routing information and M×M switches for each channel and enabling a reduction in circuit scale.

Furthermore, logical channel information is generated for reading out, in a prescribed order, each item of byte data from packet memories in which packet data for each logical channel are held, byte data for each logical channel are rearranged in a prescribed order in accordance with the logical channel information, and the byte data for each logical channel that have been rearranged are each multiplexed; and as a result, virtual concatenation can also be handled.

In particular, the use of a banyan net for the M×M switches enables a reduction of the switch circuits that are required for routing, thereby enabling a reduction in circuit scale.

As a result, the mounting area of a line card or a switch card such as an STM/Packet hybrid switch that incorporates the STM mapping circuit of the present invention can be decreased, and the scale of the device can be reduced.

The above and other objects, features, and advantages of the present invention will become apparent from the following description based on the accompanying drawings, which illustrate examples of preferred embodiments of the present invention.

BRIEF DESCRIPTION OF THE DRAWINGS

FIG. 1 shows examples of signal sequences that are processed in a transmission device; FIG. 1A being a schematic diagram showing an example of a signal sequence in which pad bytes have been inserted; and FIG. 1B being a schematic diagram showing an example of a signal sequence having no pad bytes.

FIG. 6 is a block diagram showing an example of the configuration of channel control memory when M=8.

FIG. 7 is a table showing an example of the configuration of a look-up table when M=4.

DETAILED DESCRIPTION OF THE PREFERRED EMBODIMENTS

The present invention is next explained with reference to the accompanying figures.

In the present invention, a configuration is proposed in which an STM mapping circuit that performs a mapping process for storing packet data to the payload areas of STS or STM transmission frames while distributing the packet data to corresponding logical channels is provided with the capability to eliminate pad bytes that have been inserted between variable-length packets.

The STM mapping circuit of the present invention is used in, for example, the packet switch of the above-described STM/Packet hybrid switch that includes, for example, an STM switch for switching STM frames, and a packet switch for separating the STM frames that have been received from the STM switch into logical channel units, and, after extracting each of the packets, performing a switching process for each of the packets.

First Embodiment

The first embodiment of the STM mapping circuit of the present invention is next described with reference to the accompanying figures.

Figure 2:
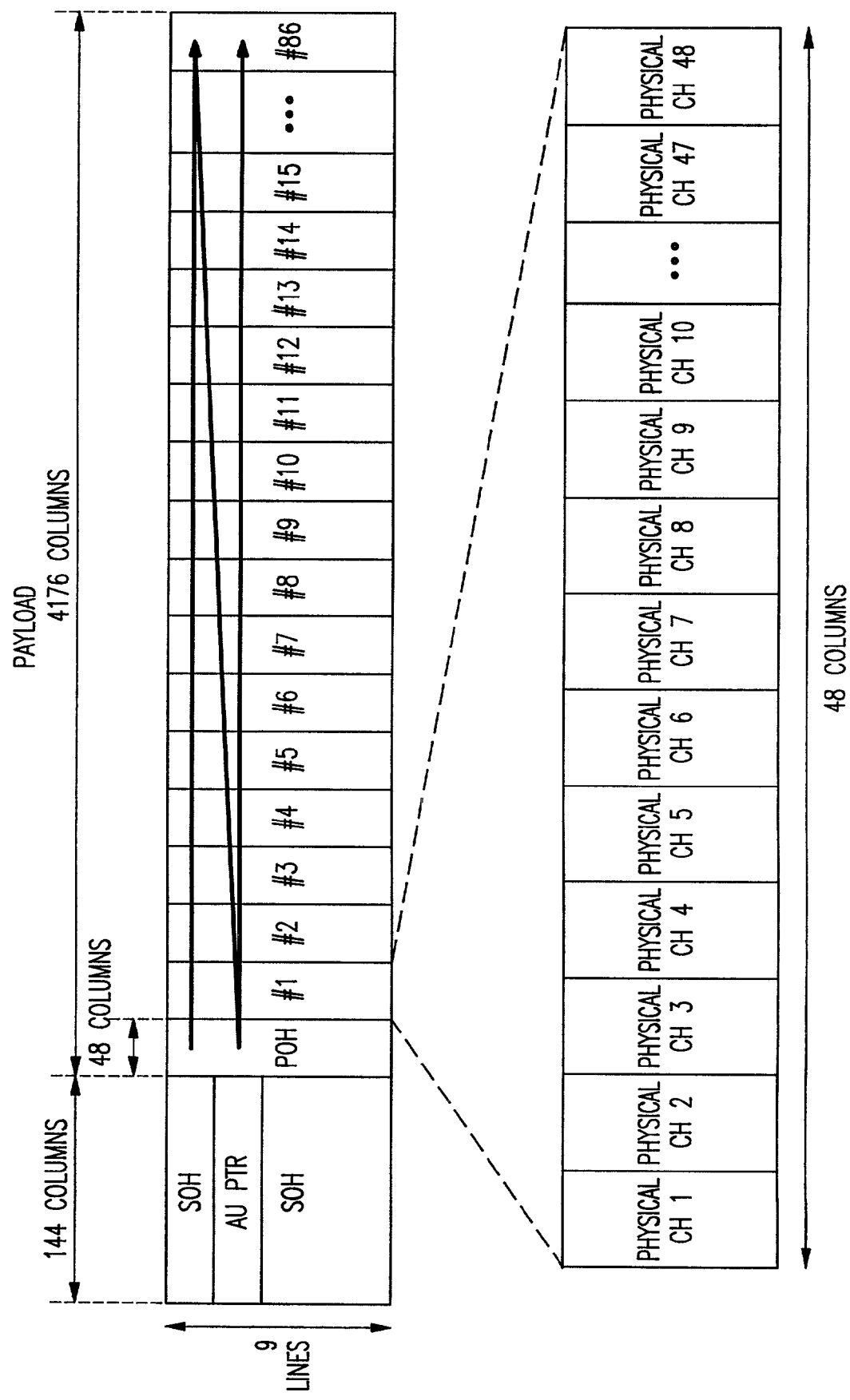
FIG. 2 is a schematic diagram showing an example of the makeup of a transmission frame.

We refer now to FIG. 2, which is a schematic diagram showing an example of the constitution of a transmission frame. STS-n is a multiplexing format that is prescribed for a SONET (Synchronous Optical Network), and STM-n is a multiplexing format that is prescribed for SDH (Synchronous Digital Hierarchy).

As shown in FIG. 2, an STS or STM transmission frame is constituted such that SOH (Section Over Head) areas and an AU PTR (Administrative Unit Pointer) area are provided at the head, and payload areas (including POH (Path Over Head) areas) are provided following this head.

In the case of STM-16, for example, the payload area is made up by 48 AU-3 (51.84 Mbps), and if one physical channel is assigned to AU-3, a maximum of 48 physical channel byte data are stored in the payload area. The byte data of each physical channel are stored in the payload area in the order indicated by the arrow shown in FIG. 2. Each row in FIG. 2 is made up by eight bits (1 byte), and the data of one physical channel is transmitted one byte at a time with each clock on the transmission path.

An STM mapping circuit performs mapping for storing each item of byte data in prescribed physical channels of the payload area while eliminating unnecessary pad bytes when generating the frames shown in FIG. 2.

Figure 3:
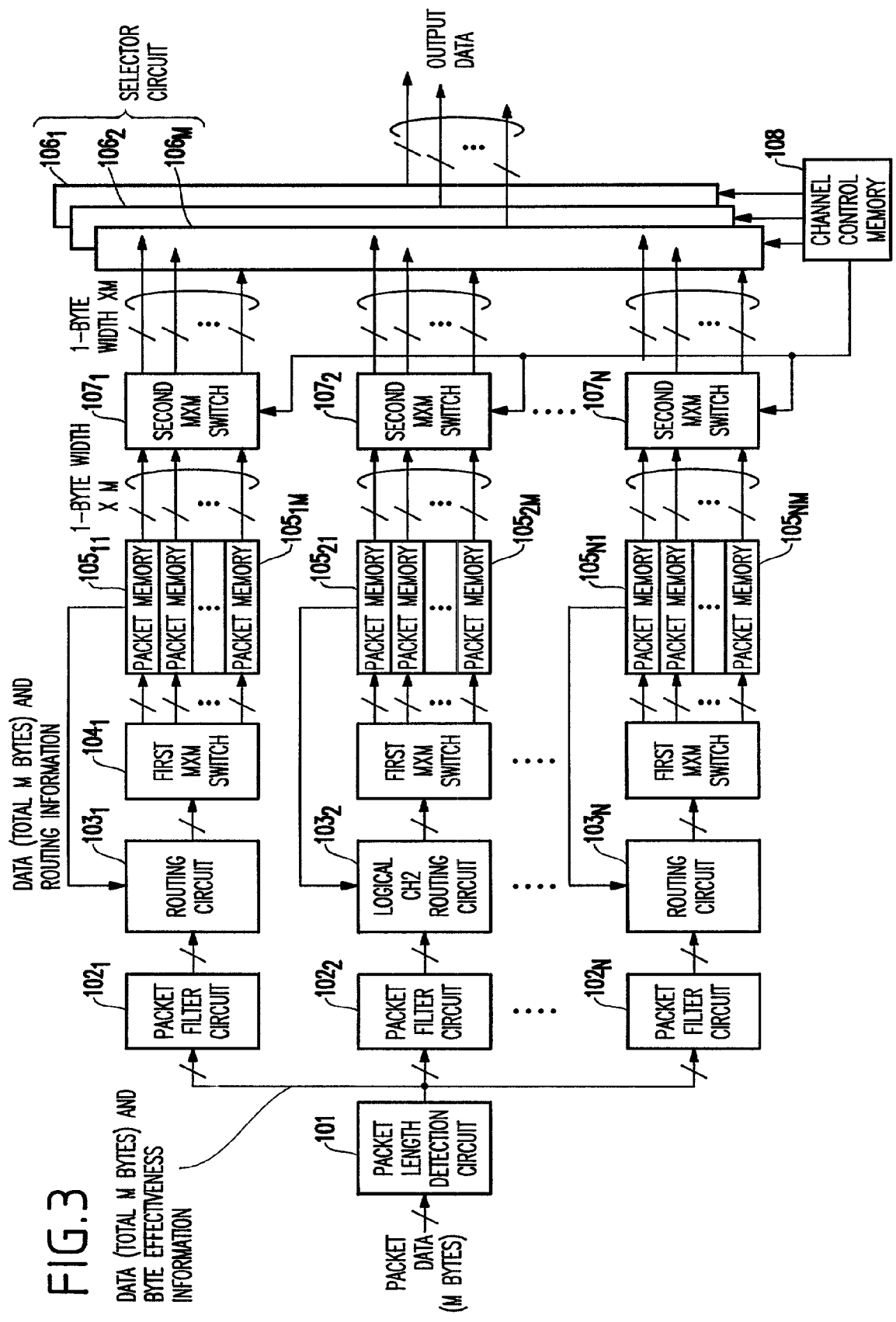
FIG. 3 is a block diagram showing the configuration of the first embodiment of the STM mapping circuit of the present invention.

We now refer to FIG. 3, which is a block diagram showing the configuration of the first embodiment of the STM mapping circuit of the present invention.

As shown in FIG. 3, the STM mapping circuit of this embodiment is a configuration that includes:

packet length detection circuit 101 that detects the packet length of received packet data and generates, for every M ($M=2^k$; where k is a positive integer) items of parallel-expanded byte data, M bits of byte effectiveness information that indicate whether the data are effective byte data or not (pad byte);

N (where N is a positive integer) packet filter circuits $102_1$–$102_N$ that each take in packet data of their own logical channels in accordance with channel number signals that are received simultaneously with packet data and that indicate which logical channel the packet data belong to;

N routing circuits $103_1$–$103_N$ that generate routing information for controlling the routing process in first M×M switches $104_1$–$104_N$, which are to be explained;

N first M×M switches $104_1$–$104_N$ that distribute M bytes of data to M output ports;

packet memories $105_{11}$–$105_{NM}$ for M×N channels that are made up by M independent FIFO (First-in First-out) memories that temporarily store packet data that have been distributed by first M×M switches $104_1$–$104_N$;

channel control memory 108 in which logical channel information is recorded that indicates the relation between each physical channel of a transmission frame and the logical channel that is assigned to that physical channel;

second M×M switches $107_1$–$107_N$ that switch, in byte units, packet data that have been stored in packet memories $105_{11}$–$105_{NM}$ based on logical channel information that is output from channel control memory 108; and selector circuits $106_1$–$106_M$ that select and output in byte units the output of second M×M switches $107_1$–$107_N$ based on the logical channel information that is outputted from channel control memory 108.

Packet length detection circuit 101 generates M bits of byte effectiveness information for each byte that indicates whether the packet data that have been parallel-expanded to M signals of byte data are effective data or ineffective data (pad bytes).

In the case of the packet data shown in FIG. 1A, for example, eight bits of byte effectiveness information are generated corresponding to byte data A-1 to A-8, which are the first eight bytes, that indicate that all of the bytes are effective data. For the next eight bytes, byte effectiveness information is generated that indicates that byte data A-9 to A-10 are effective data and byte 2 to byte 7 are ineffective data (pad bytes).

The packet length of each item of packet data can be detected from the value of the packet length area of the header portion. The above-described GFP or SDL variable-length packets have packet length areas in which the value of the packet length is stored in the header portion. More specifically, the PLI area is used in GFP and the LENGTH area is used in SDL. In addition, packet data and channel number signals that indicate which logical channel the packet data belongs to are applied as input to packet length detection circuit 101.

Packet filter circuits 102$_1$–102$_N$ are circuits that monitor each of the channel number signals that are output from packet length detection circuit 101 and take in byte data if the byte data pertain to that logical channel number.

Routing circuits 103$_1$–103$_N$ generate routing information that is used in first M×M switches 104$_1$–104$_N$ of the succeeding stage. For example, the routing circuits generate information for eliminating each of the pad bytes from the byte data shown in FIG. 1A and routing to the positions shown in FIG. 1B.

Figure 4:
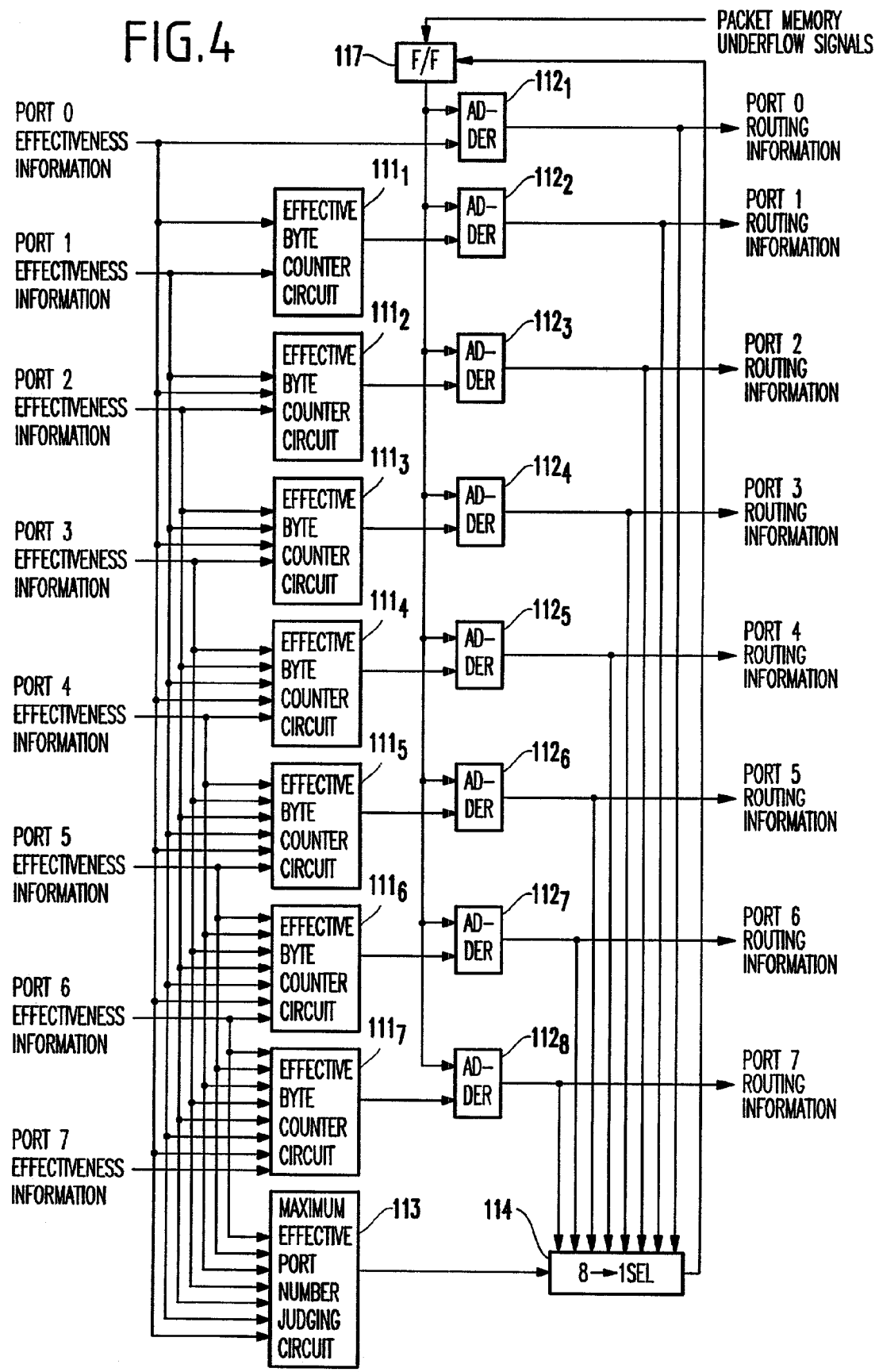
FIG. 4 is a block diagram showing an example of the configuration of the routing circuit shown in FIG. 3.
Figure 5:
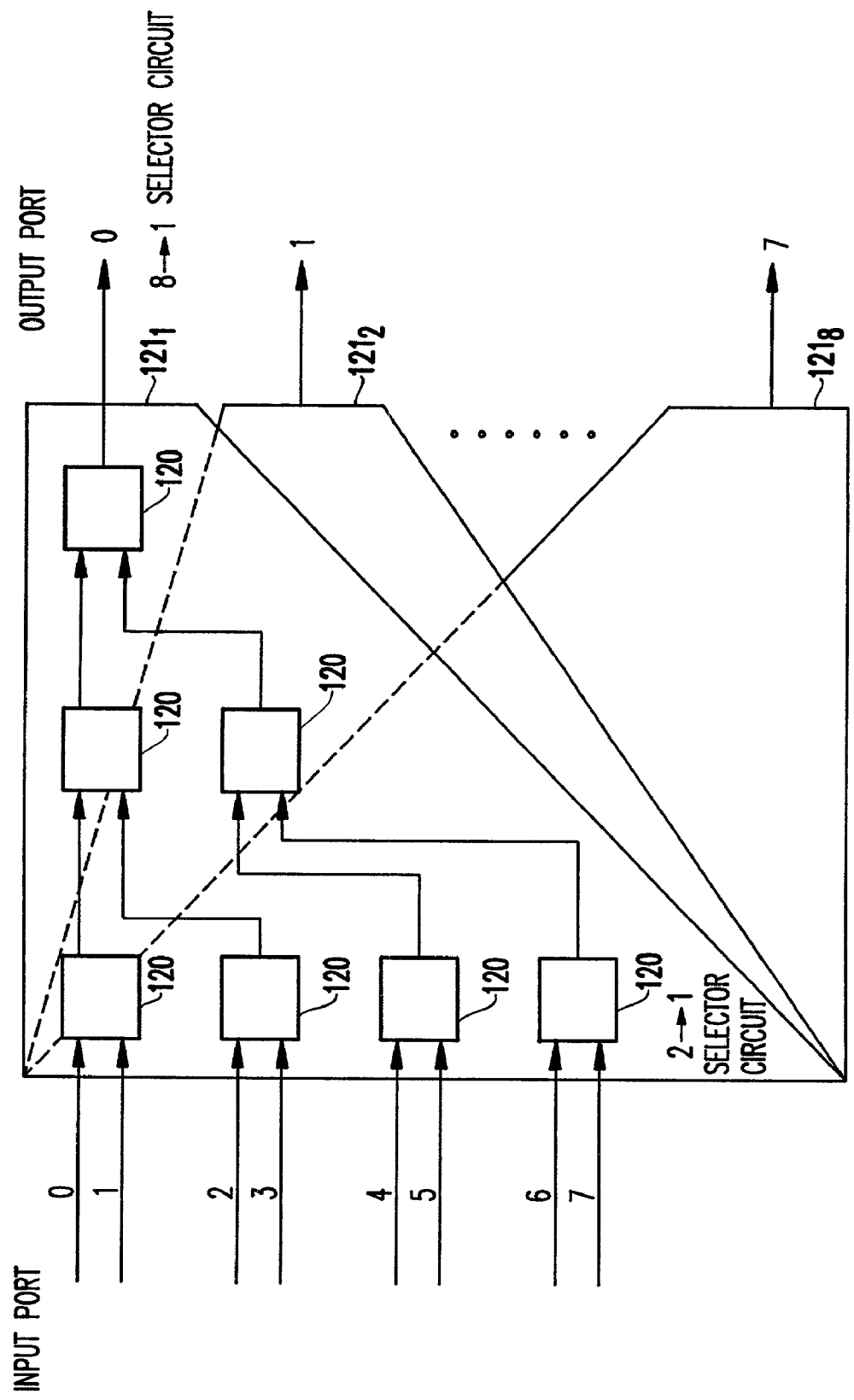
FIG. 5 is a block diagram showing an example of the configuration of first M(M switches shown in FIG. 3.

We now refer to FIG. 4, in which is shown a block diagram of an example of the construction of the routing circuit that is shown in FIG. 3; and FIG. 5, in which is shown a block diagram of an example of the construction of the first M×M switches that are shown in FIG. 3. Routing circuits 103$_1$–103$_N$ that are shown in FIG. 4 have a configuration for a case in which the parallel expansion number M is 8, and the example of first M×M switches 104$_1$–104$_N$ that is shown in FIG. 5 is an example of the configuration of an 8×8 switch in which M=8.

As shown in FIG. 4, routing circuits 103$_1$–103$_N$ are of a configuration that includes: effective byte counter circuits 111$_1$–111$_7$ that count the number of effective data based on byte effectiveness information; maximum effective port number judging circuit 113 that determines the maximum value of the port number in which effective data are stored; 8→1 selector circuit (8→1 SEL) 114 that selects the port number in which effective data were last stored in accordance with the judgment results of maximum effective port number judging circuit 113; flip-flop circuit (F/F) 117 that both holds information of the port number that was selected by 8→1 selector circuit 114 and outputs the information in accordance with packet memory underflow signals that indicate that the corresponding packet memory is empty; and adders 112$_1$–112$_8$ that add the output signals of flip-flop circuit 117 and the output signals of effective byte number counter circuits 111$_1$–111$_7$ and output the result as routing information. In addition, adders 112$_1$–112$_8$ subtract M from the addition result when the addition result is equal to or greater than M to output a value within the range from 0 to M−1.

First M×M switches 104$_1$–104$_N$ are of a construction that includes a number M of M→1 selector circuits. The M(1 selector circuits are in turn made up by (M−1) 2→1 selector circuits 120.

When M=8, for example, first M×M switches (8×8 switches) 104$_1$–104$_N$ are made up by eight 8→1 selector circuits 121$_1$–121$_8$ as shown in FIG. 5, and eight items of parallel-expanded byte data are applied as input to input ports 0–7 of each of 8→1 selector circuits 121$_1$–121$_8$.

8→1 selector circuits 121$_1$–121$_8$ select one item of byte data from the received eight items of byte data in accordance with routing information and output the selected byte data to the output ports.

Packet memories 105$_{11}$–105$_{NM}$ are each constituted by FIFO (First-in First-out) memories that are separated into M ports, sequentially store the M items of byte data that have been distributed by first M×M switches 104$_1$–104$_N$, and output a maximum of M items of byte data for each clock. When a FIFO memory becomes empty, a packet memory underflow signal is outputted to routing circuits 103$_1$–103$_N$ with each clock.

Second M×M switches 107$_1$–107$_N$ perform switching in byte units based on the logical channel information that is outputted from channel control memory 108.

We now refer to FIG. 6, in which is shown a block diagram of an example of the configuration of a channel control memory where M=8.

Channel control memory 108 records in table form the relation of the logical channels that are assigned to each physical channel of a transmission frame.

In the table that is shown in FIG. 6, for example, logical channels (CH) 1–8 are assigned to respective physical channels (CH) 1–48. Specifically, logical CH1 is assigned to physical CH1-physical CH8, logical CH2 is assigned to physical CH9-physical CH13, logical CH3 is assigned to physical CH14-physical CH16, logical CH4 is assigned to physical CH17-physical CH24, logical CH5 is assigned to physical CH25-physical CH28, logical CH6 is assigned to physical CH29-physical CH32, logical CH7 is assigned to physical CH33-physical CH44, and logical CH8 is assigned to physical CH45-physical CH48.

The logical channel information is, for example, a signal that indicates the logical channel number (binary) that corresponds to every eight logical channels that are processed for each clock (M=8) and is outputted from channel control memory 108 with an 8 (8-bit or 64-bit width.

Each of second M×M switches 107$_1$–107$_N$ counts the number of physical channels that are assigned to its own logical channel based on the logical channel information that is received from channel control memory 108 and reads out from the corresponding packet memories 105$_{11}$–105$_{NM}$ a number of items of byte data that matches the count number.

At this time, second M×M switches 107$_1$–107$_N$ first record the ordinal number of the FIFO memory (the first, second, third, etc.) that stores, of the data that are stored in the corresponding packet memory, the data that were read last in the previous process (the first byte, the second byte, the third byte, etc.); and when data are next read from the packet memory, read out byte data of the above-described count number from the succeeding FIFO memory. When data have been read from the last FIFO memory that makes up the packet memory, data reading returns to the first FIFO memory.

Specifically, when the packet memory is made up by eight (M=8) FIFO memories, second M×M switches 107$_1$–107$_N$, upon reading the data of byte 7, return to byte 0 and continue reading data in order up to byte 7. At this time, since packet memories 105$_{11}$–105$_{NM}$ are constituted by FIFO memories, second M×M switches 107$_1$–107$_N$, upon finishing reading the data for bytes 0–7 of any address, count up the addresses and continue reading the data of the next bytes 0–7 in order.

Second M×M switches 107$_1$–107$_N$ that have read a prescribed number of byte data switch each of the read byte data to the output ports that correspond to the physical channels that are assigned to their own logical channels in accordance with logical channel information.

For example, when the logical channel information that is recorded in channel control memory 108 is represented by the table shown in FIG. 6, the logical channel information that is output in the first clock is {CH1, CH1, CH1, CH1, CH1, CH1, CH1, CH1}.

At this time, only second M×M switches $107_1$, which corresponds to logical channel 1, operates; and the number of the logical CH1 in the logical channel information, i.e., an 8-byte portion of data, are read from packet memories $105_{11}$–$105_{1M}$.

If the packet memory from which the last data were read by second M×M switch $107_1$ in the previous process is byte 3 (packet memory $105_{13}$), second M×M switches $107_1$ reads data one byte at a time from byte 4 (packet memory $105_{15}$) as far as byte 7 (packet memory $105_{18}$), and then, returns to byte 0 and continues reading data one byte at a time from byte 0 (packet memory $105_{11}$) to byte 3 (packet memory $105_{14}$). The read addresses of FIFO memories differ for bytes 4–7 and bytes 0–3, the addresses for bytes 0–3 being values that are exactly "1" greater.

Second M×M switch $107_1$ switches each of the read eight bytes of data to the output ports that correspond to the physical channels to which logical CH1 is assigned in the logical channel information.

For example, when the leading packet memory that is currently being read is byte 4 (packet memory $105_{15}$), switching is performed such that the data from byte 4 (packet memory $105_{15}$) to byte 7 (packet memory $105_{18}$) are output in order to output ports 1–4 of second M×M switch $107_1$, and the data from byte 0 (packet memory $105_{11}$) to byte 3 (packet memory $105_{14}$) are outputted in order to output ports 5–8 of second M×M switch $107_1$.

Second M×M switches $107_1$–$107_N$ generate routing information that indicates the switching route as a look-up table, and uses the routing information to perform routing of the byte data that have been read from the packet memories.

The routing information is determined by the leading byte number 0 (corresponding to packet memory $105_{11}$)—7 (corresponding to packet memory $105_{18}$) that starts the current reading and the relevant CH output position that corresponds to the physical channel to which its own logical channel is assigned.

FIG. 7 is a table showing an example of the constitution of a look-up table when M=4.

The look-up table shown in FIG. 7 records each of: the relevant CH output position in the logical channel information that has been received from channel control memory 108; the leading memory number; routing information that corresponds to byte 0 (corresponding to packet memory $105_{11}$) of input port 0; routing information that corresponds to byte 1 (corresponding to packet memory $105_{12}$) of input port 1; routing information that corresponds to byte 2 (corresponding to packet memory $105_{13}$) of input port 2; and routing information that corresponds to byte 3 (corresponding to packet memory $105_{14}$) of input port 3.

The relevant CH output position is found by comparing and collating the logical channel information and the relevant logical channel number. For example, if the logical channel information is {CH1, CH1, CH2, CH3} for logical channel 1, the relevant CH output position is "1100". In addition, the logical channel information is "0010" for logical channel 2, the logical channel information "0001" for logical channel 3, and the logical channel information is "0000" for logical channel 4.

The routing information is constituted by 2 bits, "00" directing switching for routing to output port 0. Similarly, "01" directs routing to output port 1, "10" directs routing to output port 2, and "11" directs routing to output port 3.

As an example, a case is considered in which the logical channel information is {CH1, CH1, CH1, CH1} and the leading memory number is "3".

At this time, the relevant CH output position of logical channel 1 is "1111". If the leading memory number is "3", the data of byte 0 (corresponding to packet memory $105_{11}$) of input port 0 are output to output port 1 in accordance with routing information "01". Similarly, the data of byte 1 (corresponding to packet memory $105_{12}$) of input port 1 are output to output port 2 in accordance with routing information "10", the data of byte 2 (corresponding to packet memory $105_{13}$) of input port 2 are output to output port 3 in accordance with routing information "11", and the data of byte 3 (corresponding to packet memory $105_{14}$) of input port 3 are output to output port 0 in accordance with routing information "00".

The relevant CH output positions for logical channels other than logical channel 1 are set to "0000", and switching is therefore performed such that the input port and output port match. At this time, the relevant byte number is "0", and as a result, value "0" is switched without reading anything from each of packet memories $105_{21}$–$105_{N4}$.

The byte data that have been rearranged (sorted) by second M(M switches $107_1$–$107_N$ are selected and output by selector circuits $106_1$–$106_M$, and the byte data are multiplexed for each logical channel.

Selector circuits $106_1$–$106_M$ use the logical channel information that has been outputted from channel control memory 108 as selection signals and select and output the byte data of logical channel 1 to logical channel N in accordance with the corresponding logical channel information.

For example, if the number of logical channels N is 48 and logical channel information in which logical channels 1–48 are set in order to physical channels 1–48 is recorded in channel control memory 108, logical channels 1–48 are mapped in order to the payload of the STM frame and a payload portion of a 2.488 Gbps frame made up by AU-3×48 channels can be generated.

Alternatively, if the number of logical channels N is 1 and logical channel information in which physical channels 1–48 are all set to logical channel 1 is recorded in channel control memory 108, only logical channel 1 is mapped to the payload of the STM frame and a payload portion of a 2.488 Gbps frame in which one logical channel is assigned to AU-3×48 channels can be generated.

As described in the foregoing explanation, the constitution of the present embodiment enables the realization of an STM mapping circuit that is capable of mapping data while eliminating pad bytes.

Second Embodiment

Explanation is next presented regarding the second embodiment of the STM mapping circuit of the present invention with reference to the accompanying figures.

In the STM mapping circuit shown in the first embodiment, first M×M switches $104_1$–$104_N$ are constituted by a number M of M→1 selector circuits, and the M→1 selector circuits are in turn constituted by (M−1) 2→1 selector circuits.

Accordingly, a number M ((M−1) of 2→1 selector circuits are required to constitute first M×M switches $104_1$–$104_N$, the number of 2→1 selector circuits required to constitute the first M×M switches increasing as M increases. In the present embodiment, an STM mapping circuit is proposed that enables a reduction in the circuit scale.

Figure 8:
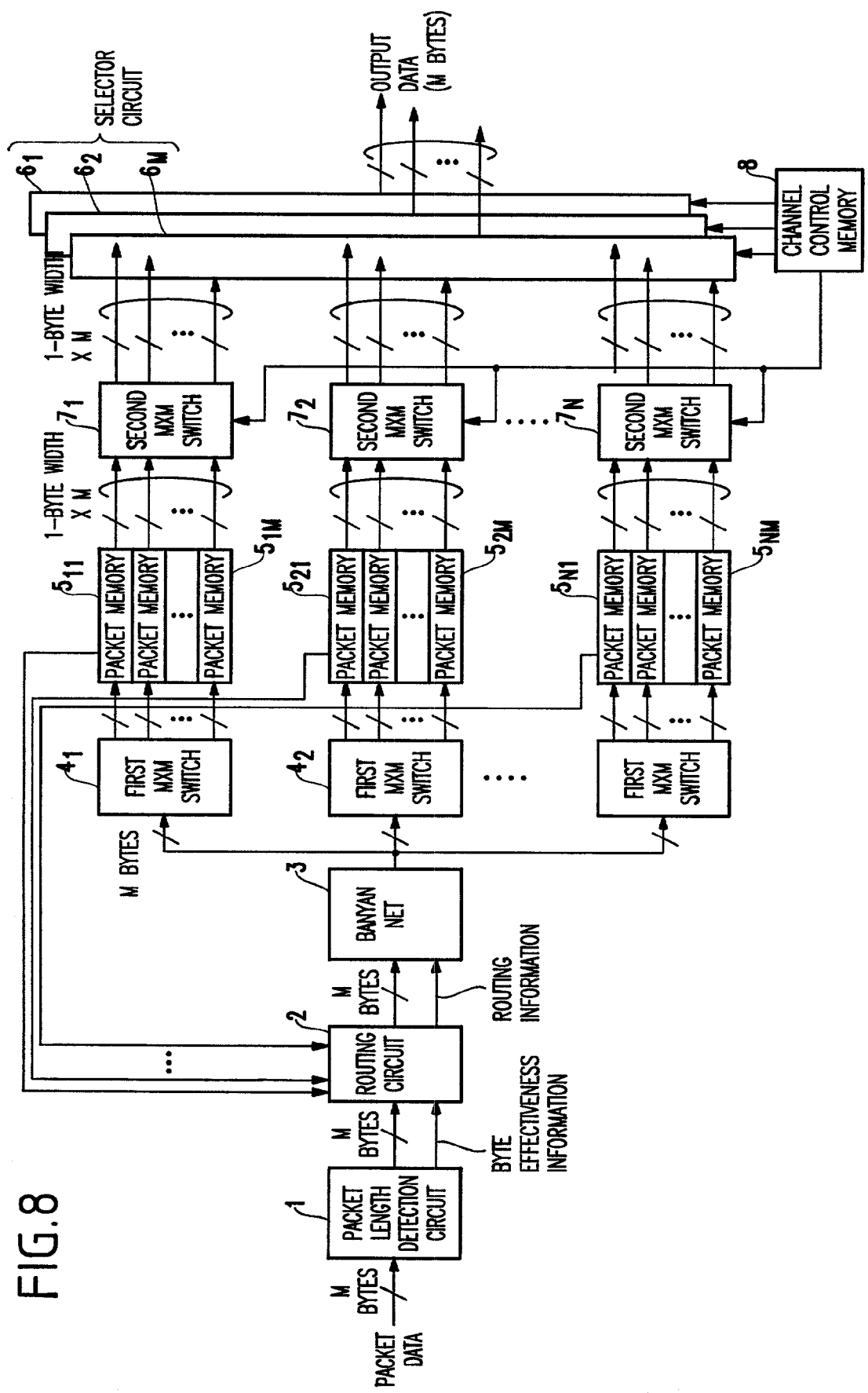
FIG. 8 is a block diagram showing the configuration of the second embodiment of the STM mapping circuit of the present invention.

We now refer to FIG. 8, which is a block diagram showing the configuration of the second embodiment of the STM mapping circuit of the present invention.

As shown in FIG. 8, the STM mapping circuit of this embodiment is a configuration that includes:

packet length detection circuit 1 that detects the packet length-of received packet data and generates, for every M items of parallel-expanded byte data, M bits of byte effectiveness information that indicate whether the data are effective byte data or not (pad byte);

routing circuit 2 that generates routing information for controlling the routing process in a banyan net that is to be explained hereinbelow;

banyan net 3 that distributes M items of byte data to M output ports for every N logical channels;

N packet filter circuits $4_1$–$4_N$ that each take in packet data that are to be processed in its own in the relevant logical channel based on channel number signals that are received simultaneously with the packet data and that indicate the mapping destination of the packet data;

a number M×N of packet memories $5_{11}$–$5_{NM}$ that are made up by M FIFO (First-in First-out) memories for each channel that temporarily store packet data that have been distributed by banyan net 3;

channel control memory 8 in which are recorded the relations of the logical channels that are assigned to each physical channel of a transmission frame;

M×M switches $7_1$–$7_N$ that read out packet data that have been stored in packet memories $5_{11}$–$5_{NM}$ and switch the packet data in byte units based on logical channel information that is outputted from channel control memory 8; and selector circuits $6_1$–$6_M$ that select and output in byte units the output of M×M switches $7_1$–$7_N$ based on the logical channel information that is outputted from channel control memory 8.

Packet data, byte effectiveness information, and channel information signals that have been outputted from packet length detection circuit 1, and packet memory underflow signals that are outputted from the N packet memories $5_1$–$5_N$ are each applied as input to routing circuit 2. In addition, M bytes of byte data, channel information signals, and the routing information of each item of byte data that are outputted from routing circuit 2 are applied as input to banyan net 3.

As in the first embodiment, packet length detection circuit 1 both distributes the packet data that have been parallel-expanded into M signals of byte data to data for each of the N logical channels and generates M bits of byte effectiveness information that indicate whether the byte data are effective data or ineffective data (pad bytes).

Routing circuit 2 generates routing information that is used in the next stage, i.e., banyan net 3.

Figure 9:
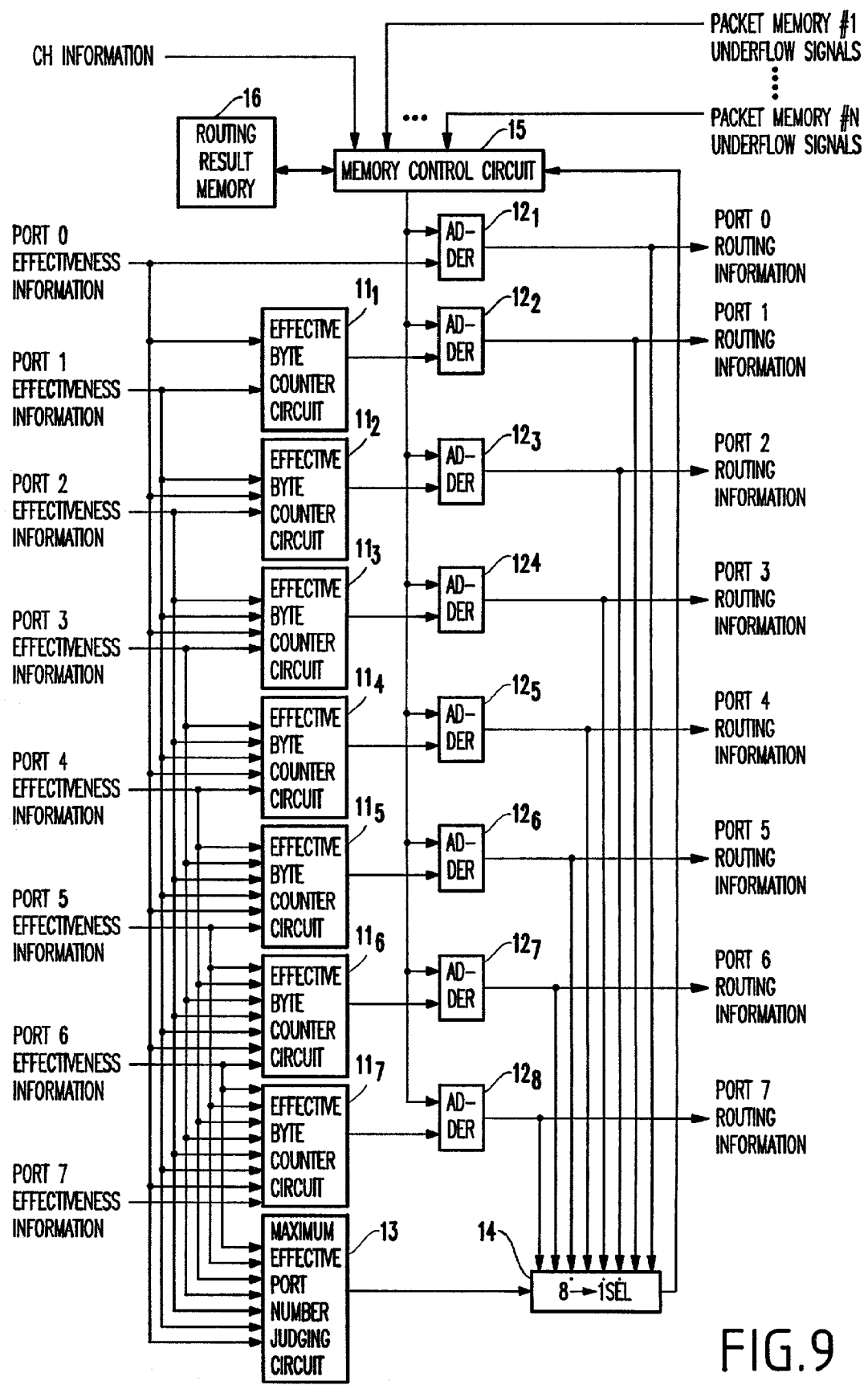
FIG. 9 is a block diagram showing an example of the configuration of the routing circuit shown in FIG. 8.
Figure 10:
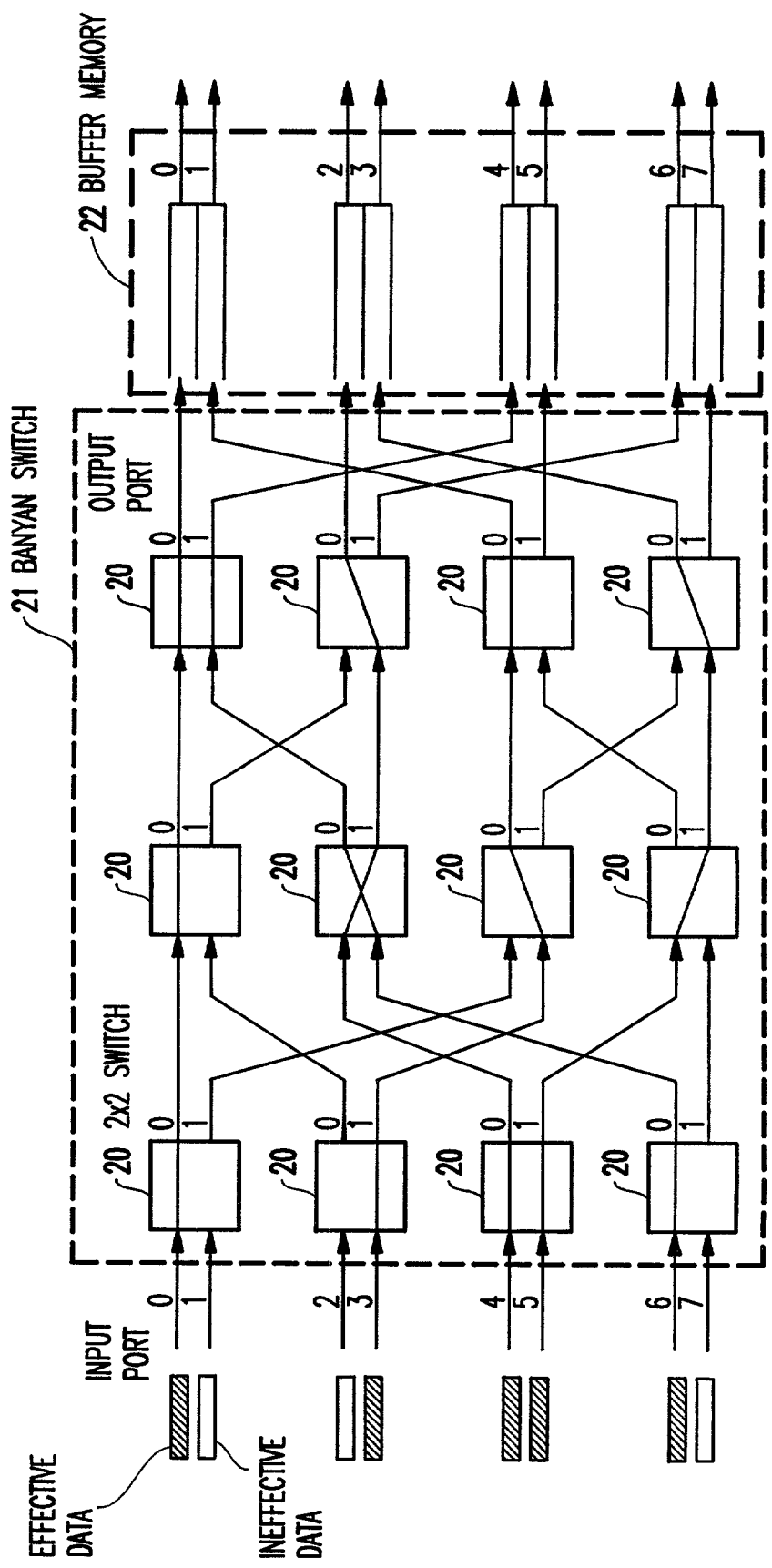
FIG. 10 is a block diagram showing an example of the configuration of the banyan net shown in FIG. 8.

FIG. 9 is a block diagram showing an example of the configuration of the routing circuit shown in FIG. 8, and FIG. 10 is a block diagram showing an example of the constitution of the banyan net shown in FIG. 8. The routing circuit that is shown in FIG. 9 presents an example of the configuration when the parallel expansion number M is 8, and the banyan net shown in FIG. 10 shows an example of the configuration when M is 8.

As shown in FIG. 9, routing circuit 2 is a configuration that includes: effective byte number counter circuits $11_1$–$11_7$ that count the number of effective data based on byte effectiveness information; maximum effective port number judging circuit 13 that determines the maximum value of the port number in which effective data are stored; 8→1 selector circuit (8→1 SEL) 14 that selects the port number in which effective data were last stored in accordance with the judgment results of maximum effective port number judging circuit 13; routing result memory 16 that holds signals that indicate which port of the M ports data were last written to for each of logical channels 1-N for time division processing of the N logical channels at the single routing circuit 2; memory control circuit 15 that reads and outputs the last routing result of the logical channel from the packet memory based on the channel number signals that are received as input simultaneously with packet data; and adders $12_1$–$12_8$ that add the output signals of memory control circuit 15 and the output signals of effective byte number counter circuits $11_1$–$11_7$ and output the result as routing information. In addition, adders $12_1$–$12_8$ subtract M from the addition result when the addition result is equal to or greater than M to output a value within the range from 0 to M−1. Furthermore, packet memory underflow signals for each logical channel are applied as input from the packet memories to memory control circuit 15. When the rising edge of an underflow signal (=1) is detected, the relevant logical channel of routing result memory 16 is initialized and the byte data of the relevant logical channel that first arrive following the occurrence of underflow are routed from port 0.

As shown in FIG. 10, banyan net 3 is a configuration that includes: banyan switch 21, and buffer memory 22 that temporarily holds the routing results of banyan switch 21.

As shown in FIG. 10, banyan switch 21 is a configuration in which (M/2) 2×2 switches 20 are connected in k ($2^k$=M) stages. For example, banyan switch 21 shown in FIG. 10 is a configuration for a case in which M=8, and four 2×2 switches 20 are therefore connected in three stages. The output ports of the final stage of 2×2 switches 20 are connected to respective ports of buffer memory 22.

FIG. 10 shows a state in which no byte data are stored in buffer memory 22 and shows a case in which effective data are applied as input to input ports 0, 3, 4, 5, and 6 and ineffective data such as pad bytes are applied as input to the other ports. In addition, FIG. 10 shows a case in which the effective data that are applied from each input port are stored in order from port 0 to port 7 of buffer memory 22. In other words, effective data that are applied from input port 0 are routed to port 0 of buffer memory 22, effective data that are applied from input port 3 are routed to port 1 of buffer memory 22, effective data that are applied from input port 4 are routed to port 2 of buffer memory 22, effective data that are applied from input port 5 are routed to port 3 of buffer memory 22, and effective data that are applied from input port 6 are routed to port 4 of buffer memory 22. In this way, the effective data are sorted and stored in each of ports 0–4 of buffer memory 22 without causing blocking.

Each 2×2 switch 20 of the first stage constituting banyan switch 21 performs switching according to the values of the least significant bit that indicates in binary notation the port number of buffer memory 22 that is the routing destination. For example, switching is performed in accordance with value "0" of the least significant bit such that effective data that are applied as input from input port 0 are routed to "000", i.e., port 0, of buffer memory 22. Similarly, switching is performed in accordance with value "1" of the least significant bit such that effective data that are received from input port 1 are routed to "001", i.e., port 1, of buffer memory 22.

Each 2×2 switch 20 of the second stage performs switching in accordance with the second bit that indicates in binary notation the port number of buffer memory 22 that is the routing destination. For example, switching is performed in accordance with value "0" of the second bit such that effective data that are received from input port 0 are routed to "000", i.e., port 0, of buffer memory 22. Similarly, switching is performed in accordance with value "0" of the second bit such that effective data that are received from input port 1 are routed to "001", i.e., port 1, of buffer memory 22.

Each 2×2 switch 20 of the third stage performs switching in accordance with the value of the third bit that indicates in binary notation the port number of buffer memory 22 that is the routing destination. For example, switching is performed in accordance with value "0" of the third bit such that effective data that are received from input port 0 are routed to "000", i.e., port 0, of buffer memory 22. Similarly, switching is performed in accordance with value "0" of the third bit such that effective data that are received from input port 1 are routed to "001", i.e., port 1, of buffer memory 22.

Figure 11:
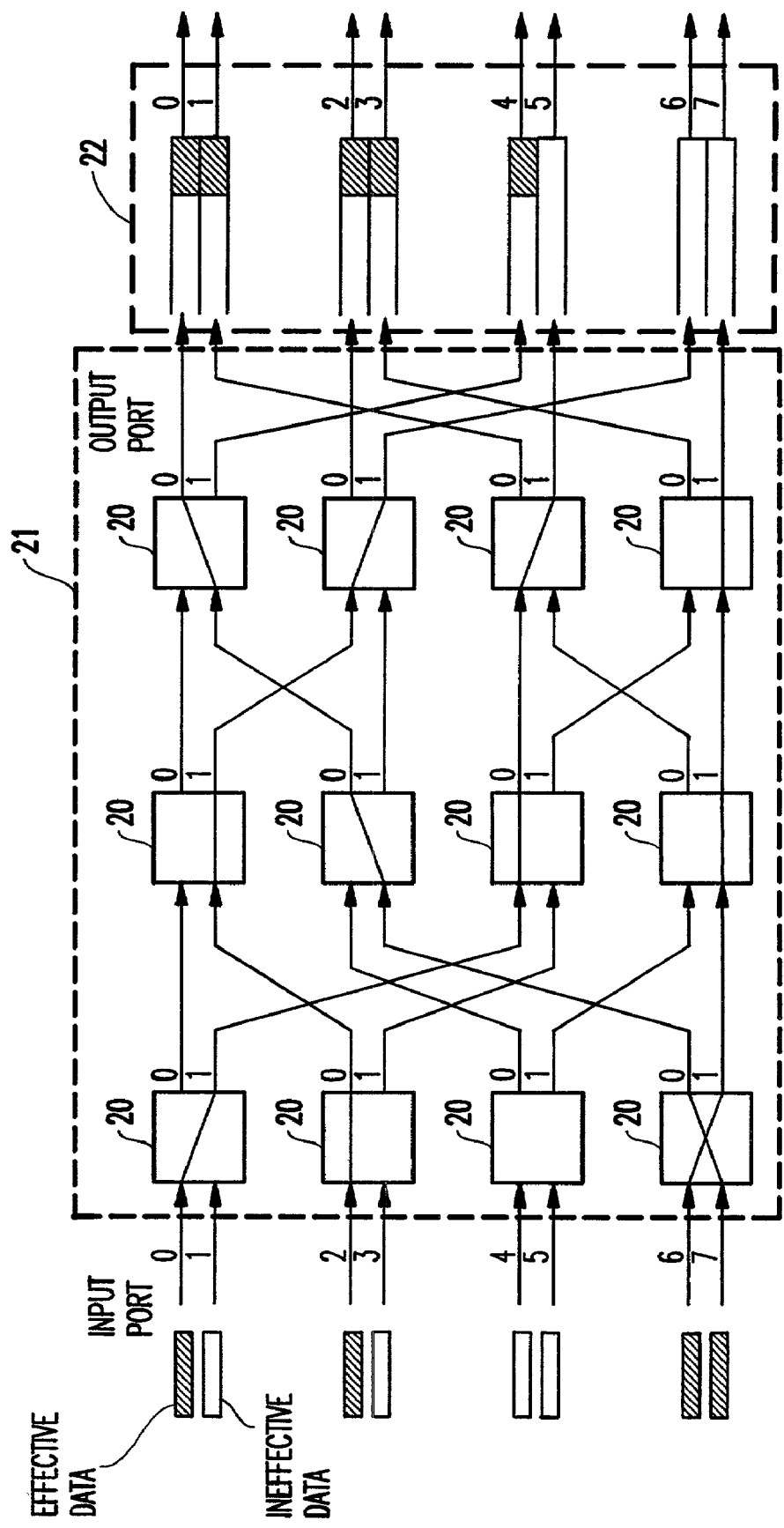
FIG. 11 is a block diagram showing the state of the banyan net shown in FIG. 10 in the succeeding processing period.

FIG. 11 shows the state in the succeeding processing period of the banyan net that is shown in FIG. 10, and illustrates the operation when effective data are applied as input to input ports 0, 2, 6, and 7.

As shown in FIG. 11, routing is performed from port 5 because byte data are stored up to port 4 of buffer memory 22.

In FIG. 11, effective data that have been applied as input from input port 0 are routed to port 5 of buffer memory 22, effective data that have been applied as input from input port 2 are routed to port 6 of buffer memory 22, effective data that have been applied as input from input port 6 are routed to port 7 of buffer memory 22, and effective data that have been applied as input from input port 7 are routed to port 0 of buffer memory 22.

As described in, for example, Introduction to ATM: Passport to the Multimedia Age (Yokogawa Digital Computer KKK, SI Project Headquarters, pp. 49–50), banyan net 3 has the capability to sort input signal sequences without blocking.

The use of banyan net 3 in the routing of packet data as in the present embodiment enables a smaller circuit scale than a case in which M×M switches are employed as in the first embodiment. In particular, the routing of logical channel packet data for N channels is realized by time division processing by a single banyan net 3 in the present embodiment, and the present embodiment therefore allows a still greater reduction in circuit scale than the configuration of the first embodiment in which M×M switches are provided for each logical channel.

If the routing for each logical channel is realized by time division processing by a single circuit as with routing circuit 2 and banyan net 3 of the present embodiment, the first M×M switches that were used in the first embodiment may be provided in place of banyan net 3. Although the circuit scale in such a case may be greater than a case in which banyan net 3 is used, first M×M switches need not be provided for each logical channel as in the first embodiment, and a smaller circuit scale than the first embodiment can therefore be realized.

Packet filter circuits $4_1$–$4_N$ monitor each of the channel number signals that are outputted from banyan net 3 with each clock and take in byte data of the channel number that is handled by their own logical channels. Byte data that are not handled by their own logical channels are discarded.

Byte data that have been taken in by packet filter circuits $4_1$–$4_N$ are sent to packet memories $5_1$–$5_N$, respectively. Packet memories $5_1$–$5_N$ are each constituted by FIFO memories that are divided into M ports for each logical channel, store byte data in each port that corresponds to an output port of banyan net 3, and output a maximum of M items of byte data for each clock. In addition, packet memories $5_1$–$5_N$ output packet memory underflow signals for each clock to routing circuit 2 when a FIFO becomes empty.

M×M switches $7_1$–$7_N$ perform switching in byte units based on the logical channel information signals that are output from channel control memory 8.

The operation of channel control memory 8 and M×M switches $7_1$–$7_N$ is identical to that of channel control memory 108 and second M×M switches $107_1$–$107_N$ of the first embodiment. Logical channel information, which is signals that indicate the logical channel numbers (binary numbers) that correspond to the eight physical channels (M=8) that are processed at each clock, is output from channel control memory 8, and M×M switches $7_1$–$7_N$ read the M items of byte data of their own logical channels in order. Routing information is then generated from their own (the relevant) CH output positions in the logical channel information and the leading memory numbers, and the byte data are rearranged in a prescribed order for each logical channel.

Selector circuits $6_1$–$6_M$ select and output byte data that are outputted from M×M switches $7_1$–$7_N$ and multiplex byte data for each logical channel. The operation of selector circuits $6_1$–$6_M$ is the same as selector circuits $106_1$–$106_M$ of the first embodiment.

Selector circuits $6_1$–$6_M$ use the logical channel information that has been outputted from channel control memory 8 as selection signals to select and output the byte data of logical channel 1-logical channel N in accordance with the corresponding logical channel information.

For example, if the number N of logical channels is 48 and logical channel information in which logical channels 1–48 are set in order to physical channels 1–48 is recorded in channel control memory 8, logical channels 1–48 are mapped in order to the payload of the STM frame and a payload portion of a 2.488 Gbps frame composed of AU-3× 48 channels can be generated.

Alternatively, if the number N of logical channels is 1 and logical channel information in which all physical channels 1–48 are set to logical channel 1 is recorded in channel control memory 8, only logical channel 1 is mapped to the payload of the STM frame and a payload portion of a 2.488 Gbps frame in which one logical channel is assigned to AU-3×48 channels can be generated.

As described in the foregoing explanation, the use of a banyan net in routing the packet data in the STM mapping circuit of the present embodiment enables a reduction in circuit scale as compared with the first embodiment. In addition, time division processing enables the M×M switches and routing circuit that were provided for each channel in the first embodiment to be constituted by a single routing circuit and banyan net 3, thereby enabling a further reduction in circuit scale. As a result, the mounting area of a line card or switch card such as an STM/Packet hybrid switch in which the STM mapping circuit of the present invention is mounted can be decreased, and the scale of the device can be reduced.

Although the above-described STM mapping circuit can be applied to a case in which, for example, packet data of 48 channels of AU-3 (51.84 Mbps) are accommodated in an STM-16 frame, assigning a single logical channel to any plurality of AU-3×i (where i is a positive integer equal to or less than 48, and AU-3×2=103.68 Mbps and AU-3× 6=311.04 Mbps) allows application to virtual concatenation in which the transmission bit rate can be set freely in units of the bandwidth of AU-3 (51.84 Mbps).

More specifically, in the setting of the channel control memory within the processing period required to read out the byte data of all physical channels (48 channels), byte data of the same logical channels may be allocated as the byte data of any plurality of physical channels and rearranged in a prescribed order for each logical channel by the second M×M switches or M×M switches, and the byte data for each logical channel may then be multiplexed and outputted by selector circuits.

While preferred embodiments of the present invention have been described using specific terms, such description is for illustrative purposes only, and it is to be understood that changes and variations may be made without departing from the spirit or scope of the following claims.

What is claimed is:

1. A synchronous transfer module (STM) mapping circuit that performs a mapping process for storing data in transmission frames while distributing the data in byte units to prescribed logical channels, comprising:
   a packet length detection circuit for receiving a plurality of byte data that have been parallel-expanded to M signals that contain pad bytes and generating byte effectiveness information that indicates whether each item of the byte data is effective data or said pad bytes;
   routing circuits for generating routing information for rearranging each of said byte data in a prescribed order while using said byte effectiveness information to eliminate said pad bytes;
   packet filter circuits for taking in each item of packet data for each logical channel in accordance with channel number signals that indicate which logical channel said packet data belong to;
   M×M switches for rearranging packet data of each of said logical channels in a prescribed order while eliminating said pad bytes in accordance with said routing information; and
   packet memories for holding, for each of said logical channels, packet data that have been rearranged by said M×M switches;
   where k is a positive integer and $M=2^k$.

2. An STM mapping circuit according to claim 1, wherein said routing circuits generate routing information to cause said M×M switches to rearrange each item of said packet data in time divisions in units of said logical channels, and said M×M switches rearrange each item of said packet data in time divisions in units of said logical channels in accordance with said routing information.

3. An STM mapping circuit according to claim 2, further comprising:
   a channel control memory in which information is recorded for reading out each item of said byte data in a prescribed order from said packet memories that are provided for each of said logical channels;
   second M×M switches for rearranging said byte data in a prescribed order in accordance with information that has been recorded in said channel control memory; and
   selector circuits for multiplexing byte data for each of said logical channels that have been output from said second M×M switches.

4. An STM mapping circuit according to claim 3, wherein said selector circuits read out, as the byte data of any plurality of physical channels, the byte data of a same logical channel within a processing period that is required for reading out the byte data of all physical channels.

5. An STM mapping circuit according to claim 2, wherein said M×M switches are banyan switches comprising a plurality of 2×2 switches connected in multiple stages.

6. An STM mapping circuit according to claim 1, further comprising:
   a channel control memory in which information is recorded for reading out each item of said byte data in a prescribed order from said packet memories that are provided for each of said logical channels;
   second M×M switches for rearranging said byte data in a prescribed order in accordance with information that has been recorded in said channel control memory; and
   selector circuits for multiplexing byte data for each of said logical channels that have been output from said second M×M switches.

7. An STM mapping circuit according to claim 6, wherein said selector circuits read out, as the byte data of any plurality of physical channels, the byte data of a same logical channel within a processing period that is required for reading out the byte data of all physical channels.

8. An STM mapping circuit according to claim 7, wherein said M×M switches are banyan switches comprising a plurality of 2×2 switches connected in multiple stages.

9. An STM mapping circuit according to claim 6, wherein said M×M switches are banyan switches comprising a plurality of 2×2 switches connected in multiple stages.

10. An STM mapping circuit according to claim 1, wherein said M×M switches are banyan switches comprising a plurality of 2×2 switches connected in multiple stages.

11. A synchronous transfer module (STM)/Packet hybrid switch comprising:
    an STM switch that performs switching of STM frames; and
    a packet switch including an STM mapping circuit, said STM mapping circuit performing a mapping process for storing data in transmission frames while distributing the data in byte units to prescribed logical channels, the STM mapping circuit comprising:
    a packet length detection circuit for receiving a plurality of byte data that have been parallel-expanded to M signals that contain pad bytes and generating byte effectiveness information that indicates whether each item of the byte data is effective data or said pad bytes;
    routing circuits for generating routing information for rearranging each of said byte data in a prescribed order while using said byte effectiveness information to eliminate said pad bytes;
    packet filter circuits for taking in each item of packet data for each logical channel in accordance with channel number signals that indicate which logical channel said packet data belong to;
    M×M switches for rearranging packet data of each of said logical channels in a prescribed order while eliminating said pad bytes in accordance with said routing information; and
    packet memories for holding, for each of said logical channels, packet data that have been rearranged by said M×M switches;
    where k is a positive integer and $M=2^k$.

12. An STM/Packet hybrid switch according to claim 11, wherein said routing circuits generate routing information to cause said M×M switches to rearrange each item of said packet data in time divisions in units of said logical channels, and said M×M switches rearrange each item of said packet data in time divisions in units of said logical channels in accordance with said routing information.

13. An STM/Packet hybrid switch according to claim 11, further comprising:

a channel control memory in which information is recorded for reading out each item of said byte data in a prescribed order from said packet memories that are provided for each of said logical channels;

second M×M switches for rearranging said byte data in a prescribed order in accordance with information that has been recorded in said channel control memory; and selector circuits for multiplexing byte data for each of said logical channels that have been output from said second M×M switches.

14. An STM/Packet hybrid switch according to claim 13, wherein said selector circuits read out, as the byte data of any plurality of physical channels, the byte data of a same logical channel within a processing period that is required for reading out the byte data of all physical channels.

15. An STM/Packet hybrid switch according to claim 11, wherein said M×M switches are banyan switches comprising a plurality of 2×2 switches connected in multiple stages.

16. A synchronous transfer module (STM) mapping method for storing data in transmission frames while distributing said data in byte units to prescribed logical channels; said method comprising:

generating, from a plurality of byte data that include pad bytes and that have been parallel-expanded to M signals, byte effectiveness information that indicates whether each item of the byte data is effective data or said pad bytes;

generating routing information for rearranging said byte data in a prescribed order while using said byte effectiveness information to eliminate said pad bytes;

taking in each item of packet data for each logical channel in accordance with channel number signals that indicate which logical channel said packet data belong to;

using M×M switches to rearrange packet data for each of said logical channels in a prescribed order while eliminating said pad bytes in accordance with said routing information; and holding packet data that have been rearranged by said M×M switches in memories for each of said logical channels;

where k is a positive integer and $M=2^k$.

17. An STM mapping method according to claim 16, wherein routing information is generated for rearranging each item of said packet data in time divisions in units of said logical channels, and said M×M switches are used to rearrange each item of said packet data in time divisions in units of said logical channels in accordance with said routing information.

18. An STM mapping method according to claim 17, wherein logical channel information is generated for reading out each item of said byte data in a prescribed order from said memories in which said packet data are held for each of said logical channels, said byte data are rearranged in a prescribed order for each of said logical channels in accordance with said logical channel information, and said byte data for each of said logical channels that have been rearranged are multiplexed.

19. An STM mapping method according to claim 18, wherein byte data of a same logical channel are read out as the byte data of any plurality of physical channels within a processing period that is required for reading out the byte data of all physical channels.

20. An STM mapping method according to claim 17, wherein said M×M switches are banyan switches comprising a plurality of 2×2 switches connected in multiple stages.

21. An STM mapping method according to claim 16, wherein logical channel information is generated for reading out each item of said byte data in a prescribed order from said memories in which said packet data are held for each of said logical channels, said byte data are rearranged in a prescribed order for each of said logical channels in accordance with said logical channel information, and said byte data for each of said logical channels that have been rearranged are multiplexed.

22. An STM mapping method according to claim 21, wherein byte data of a same logical channel are read out as the byte data of any plurality of physical channels within a processing period that is required for reading out the byte data of all physical channels.

23. An STM mapping method according to claim 22, wherein said M×M switches are banyan switches comprising a plurality of 2×2 switches connected in multiple stages.

24. An STM mapping method according to claim 21, wherein said M×M switches are banyan switches comprising a plurality of 2×2 switches connected in multiple stages.

25. An STM mapping method according to claim 16, wherein said M×M switches are banyan switches comprising a plurality of 2×2 switches connected in multiple stages.

* * * * *